United States Patent
Hogan et al.

(10) Patent No.: US 8,423,913 B1
(45) Date of Patent: Apr. 16, 2013

(54) METHODS AND APPARATUS TO DISPLAY STYLE-RELATED INFORMATION

(75) Inventors: Kevin A. Hogan, Anaheim, CA (US); Jens C. Neffe, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 1231 days.

(21) Appl. No.: 11/179,145

(22) Filed: Jul. 12, 2005

(51) Int. Cl.
*G06F 3/048* (2006.01)
*G06F 17/00* (2006.01)

(52) U.S. Cl.
USPC .......................................... 715/854; 715/234

(58) Field of Classification Search .................. 715/509, 715/513, 514, 517, 524, 737, 763, 526, 738, 715/760, 907, 853, 854, 846
See application file for complete search history.

(56) References Cited

U.S. PATENT DOCUMENTS

| | | | | |
|---|---|---|---|---|
| 5,911,145 A * | 6/1999 | Arora et al. | .................... | 715/514 |
| 5,946,678 A * | 8/1999 | Aalbersberg | ....................... | 707/3 |
| 6,144,962 A * | 11/2000 | Weinberg et al. | ..................... | 1/1 |
| 6,237,006 B1 * | 5/2001 | Weinberg et al. | ............. | 707/797 |
| 6,324,555 B1 * | 11/2001 | Sites | ............................. | 715/517 |
| 6,957,383 B1 * | 10/2005 | Smith | ......................... | 715/501.1 |
| 6,968,501 B2 * | 11/2005 | Kazumi | ....................... | 715/517 |
| 7,117,429 B2 * | 10/2006 | Vedullapalli et al. | .......... | 715/235 |
| 7,117,433 B1 * | 10/2006 | Glaser et al. | .................... | 715/513 |
| 2005/0021513 A1* | 1/2005 | Vedula et al. | ...................... | 707/3 |
| 2006/0179027 A1* | 8/2006 | Bechtel et al. | .................. | 706/45 |

* cited by examiner

*Primary Examiner* — William Bashore
*Assistant Examiner* — Henry Orr
(74) *Attorney, Agent, or Firm* — Kilpatrick Townsend & Stockton LLP

(57) ABSTRACT

A system detects an association of at least one style to at least one file, the file containing a reference to the style, and displays a representation of the style. The system also displays a representation of the file, and a representation of the association of the style to the file. The system displays a number of times the style is defined within the one file, and the number of times the style is used within the at least one file.

11 Claims, 15 Drawing Sheets

| Name ▲ | # Times Defined | # Times Used |
|---|---|---|
| ⊟ 🗀 CSS Files | | |
|     📄 doc-styles.css | — | 33 |
|     📄 site.css | — | 6 |
|     📄 styles-site.css | — | 662 |
|     📄 styles-site.css | — | 287 |
| ⊟ 🗀 Classes | | |
|     .biotext | 1 | 1 |
|     .blogbody | 0 | 2 |
|     .blug | 0 | 1 |
|     .calendar | 2 | 86 |
|     .calendarhead | 2 | 2 |
|     .cmmnts-body | 1 | 100 |
|     .cmmnts-head | 1 | 270 |
|     .cmmnts-post | 1 | 100 |
|     .comments-body | 1 | 1492 |
|     .comments-head | 1 | 643 |
|     .comments-post | 1 | 584 |
|     .copyright | 1 | 33 |
|     .date | 3 | 1522 |
|     .description | 2 | 949 |
|     .extended | 0 | 1 |
|     .foo-style-woah | 12 | 1839 |
|     .footer-text | 1 | 5 |
|     .header | 1 | 8 |
|     .kevin | 3 | 1898 |
|     .maintext | 1 | 29 |
|     .maintext-big | 1 | 6 |
|     .posted | 2 | 1837 |
|     .powered | 2 | 2 |
|     .side | 3 | 15 |
|     .sidesublist | 1 | 8 |
|     .sidetitle | 2 | 13 |
|     .syndicate | 2 | 2 |
|     .title | 3 | 1838 |
|     .trackback-body | 2 | 0 |
|     .trackback-post | 2 | 0 |
|     .trackback-url | 2 | 0 |
|     .twocolboxl_4663717 | 1 | 1 |
|     .twocolboxr_4663717 | 1 | 1 |
|     .twocolcont_4663717 | 1 | 1 |
| ⊟ 🗀 Identifiers | | |
|     #2000 | 0 | 1 |
|     #2001 | 0 | 1 |

FIG. 6

METHODS AND APPARATUS TO DISPLAY STYLE-RELATED INFORMATION

BACKGROUND

Conventional technologies for creating web content allow users to create predefined styles (e.g., fonts, colors, spacing, etc) for formatting one or more web pages. Just as web pages can be formatted using HyperText Mark-up Language (HTML) tags (i.e. <table> to define a table, <P> to define a paragraph, etc), styles can be created to define how each table or paragraph should formatted. For example, placing the <P> tag on a web page indicates the start of a new paragraph. However, defining the <P> tag as "P {text-align:center;color: red}" results in every paragraph defined by <P> being formatted as aligned in the center, and the text displayed in red. There can be different kinds of styling that appear within a document.

In HTML Styling, all styling is performed strictly through the use of HTML tags, such as "<div align="center"><p><font color="red"> This is a centered red paragraph</font></p></div>".

In Inline CSS Styling, the styling for a particular HTML element is performed directly within that element, such as "<p style="text-align:center;color:red;"> This is a centered red paragraph</p>".

In Internal CSS Styling, the style is defined at the beginning of the document (within the document's "<head>" section, and all HTML elements can make use of it. This definition appears in the document's<head> section, such as "<style type="text/css" .red-paragraph {color: red; text-align: center;}</style>". This HTML element makes use of the style "<p class="red-paragraph"> This is a centered red paragraph</p>". The use of the "CSS" acronym can be used to refer to both the styling syntax ("a CSS style") as well as the Cascading style sheets themselves.

Styles can be defined within the web page in which they are used. Styles can also be defined in a separate style document. The style document is then referenced by any web page that implements any of the styles defined within the style document. The style document is called a style sheet, or, more specifically, a Cascading Style Sheet (CSS), since a single web page can reference multiple style sheets, as well as define styles within the web page itself. The concept that a web page developer can define styles within a web page, and those styles take priority over styles 'inherited' from a style sheet referenced by that web page results in the terminology of a "Cascading" Style Sheet.

By creating predefined styles within Cascading Style Sheets, multiple web pages can reference the same style (by referencing the Cascading Style Sheet in which the referenced style is defined), assuring uniformity across all the web pages that use that style. Modifying the style attributes of a collection of web pages can be performed efficiently by simply modifying the style within the Cascading Style Sheet (referenced by each of the web pages within the collection of web pages), where the style is defined. All web pages that use that style (and reference the Cascading Style Sheet that defines that style) will be automatically updated with the modified style. This feature saves web page developers the task of individually updating the web pages each time a modification to a style is made. This feature also reduces errors, since the modified style will either work for all pages or none of the pages, allowing the web page developer to quickly see the error. Individually updating the styles on the web pages could introduce errors on some of the web pages that would be harder to detect, and might go unnoticed. It is for these reasons why Cascading Style Sheets are frequently used by web page developers.

SUMMARY

Conventional technologies for displaying style information related to hyper-linked documents suffer from a variety of deficiencies. In particular, conventional technologies that display style information concerning hyper-linked documents are limited in that they only display local style information for the currently viewed file, without exploring relationships, but do not display the Cascading Style Sheets that are linked to the HTML files, nor do they display the linked relationship between the styles and the files (HTML or Cascading Style Sheets) that define, or, in the case of HTML files, use those styles.

Embodiments disclosed herein significantly overcome such deficiencies and provide a system that includes a computer system executing a style display process that detects an association between a style, and any files that define the style, or any files that reference the style. The style display process then displays a representation of the style, and the files, and displays a representation of the association between the style and the files that reference or define the style. By representation, what is meant in one embodiment is a graphical icon that represents these entities on a graphical user interface of a display of a computer system. Depending upon the configuration, the style display process presents the information in graphical format, and/or in tabular format. The style display process also displays how many times a style is defined and how many times a style is used. The style display process provides a mechanism for changing the style name. If a style is replaced with another style, or if the style name is changed, that new style name is automatically propagated among any of the Cascading Style Sheets that define that style, and any HTML file that either utilizes that style, and/or defines that style.

During an example operation of one embodiment, suppose a web page developer is chartered with updating the web pages on a company's website, the update consisting of changing the fonts, the font size and the font color used within the tables on the web pages. Once the web page developer has determined which style(s) have been used to format the fonts, the font size and the font color of the tables within the web pages on the company's website, the web page developer needs to determine where those styles are defined, in order to make the font, font size and font color modifications to those styles. Specifically, the web page developer needs to determine which HTML pages reference the Cascading Style Sheets where the styles used by the HTML pages are defined, and which HTML pages, if any, define those styles. For example, suppose the web page developer determines that styles named ".smalltable" and ".largetable" are utilized to format the different tables on the company's website. By utilizing the style display process, the web page developer can view and quickly identify which HTML pages utilize the styles named ".smalltable" and/or ".largetable", which HTML pages define the styles named ".smalltable" and/or ".largetable", and which Cascading Style Sheets define the styles named ".smalltable" and/or ".largetable".

As an example operation, the style display process as described herein can receive a selection of, for example, a web page. The style display process can produce a graphical user interface that displays the selected web page as an icon and can show a corresponding icon for each style defined by or referenced by that web page. In this manner, the system disclosed herein can quickly allow the user to identify how styles are related to web pages. As another example, the style display process can receive a selection of a Cascading Style Sheet, and can display this style sheet as an icon in the center of a graphical user interface. The style display process can also determine and display a listing of icons representing each style defined in the style sheet on one side (e.g. the right hand side) of the style sheet icon, and can display another list, on the other (e.g. left) side of the style sheet icon, that lists each web page that references a style defined in that style sheet icon. Through this unique graphical user interface, the user can quickly determine what styles are used by and/or defined by what web page documents, and can determine what style sheets define what styles. Using the table example from above, this saves the web page developer from having to search every HTML page on the website to determine which HTML pages utilize and/or define the styles named ".smalltable" and ".largetable". This also saves the web page developer from having to search every Cascading Style Sheet to determine which Cascading Style Sheets define the styles named ".smalltable" and ".largetable".

In a tabular graphical user interface configuration, the style display process produces a listing of the styles utilized in the web pages, including how many times the style is defined, and how many times the style is used, enabling the web page developer to determine if the styles named ".smalltable" and ".largetable" are defined in more than one document. While it may be necessary to define a style in more than one file, it can also cause confusion for the web page developer to determine which HTML pages are referencing which definition of that doubly defined style. By displaying how many times a defined style is used, the style display process provides a web page developer with the necessary information to remove any unused defined styles (meaning the style display process would list a style as being defined at least once, but used zero times). Also, the tabular configuration allows a developer to quickly detect a situation in which a document references a style but that style is not defined anywhere, or if a style is defined zero times, but used at least once, meaning an attempt is being made to reference an undefined style.

Other embodiments of the disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein, as explained herein, may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 6 shows a screen shot of the system of FIG. 1 displaying the relationship, in a list view form between a style file, the number of times the style file is utilized, the styles, and the number of times the styles are defined and used within the collection of web pages, according to one embodiment disclosed herein.

DETAILED DESCRIPTION

Embodiments disclosed herein include a computer system that performs a style display process that detects the association between a style, and any files that define the style, and/or any files that reference the style. The style display process then displays a representation of the style, and the files, and displays a representation of the association between the style and the files that reference or define the style. By representation, what is meant in one embodiment is to display a graphical image, icon, line, text, or other visual indication of these elements. For example, a representation of the style can be an icon along with the name of the style. The style display process presents the information in graphical format, and in tabular format, for example within a graphical user interface or in another output format (e.g. printed on paper). The style display process can also produce a tabular graphical user interface that displays how many times a style is defined and how many times a style is used. If a style is replaced with another style, or if the style name is changed, that new style name is automatically propagated among any of the Cascading Style Sheets that define that style, and any of the HTML files that either utilizes that style and/or defines that style. A user can select a style, and view those Cascading Style Sheet and/or HTML files that define the style, as well as those HTML files that utilize the style. The user can select a Cascading Style Sheet, and view the styles defined within the Cascading Style Sheet as well as the HTML files that reference that Cascading Style Sheet. The user can also select an HTML file and view the styles associated (i.e. either utilized by the HTML file and/or defined within the HTML file) with that HTML file. The user can select a Cascading Style Sheet or a style, and view the number of times that style or Cascading Style Sheet has been defined and used within a collection of web pages.

Further details concerning the unique manner in which the system disclosed herein displays the association between styles, Cascading Style Sheet and HTML files will now be provided with respect to the Figures and the discussion below.

Figure 1:
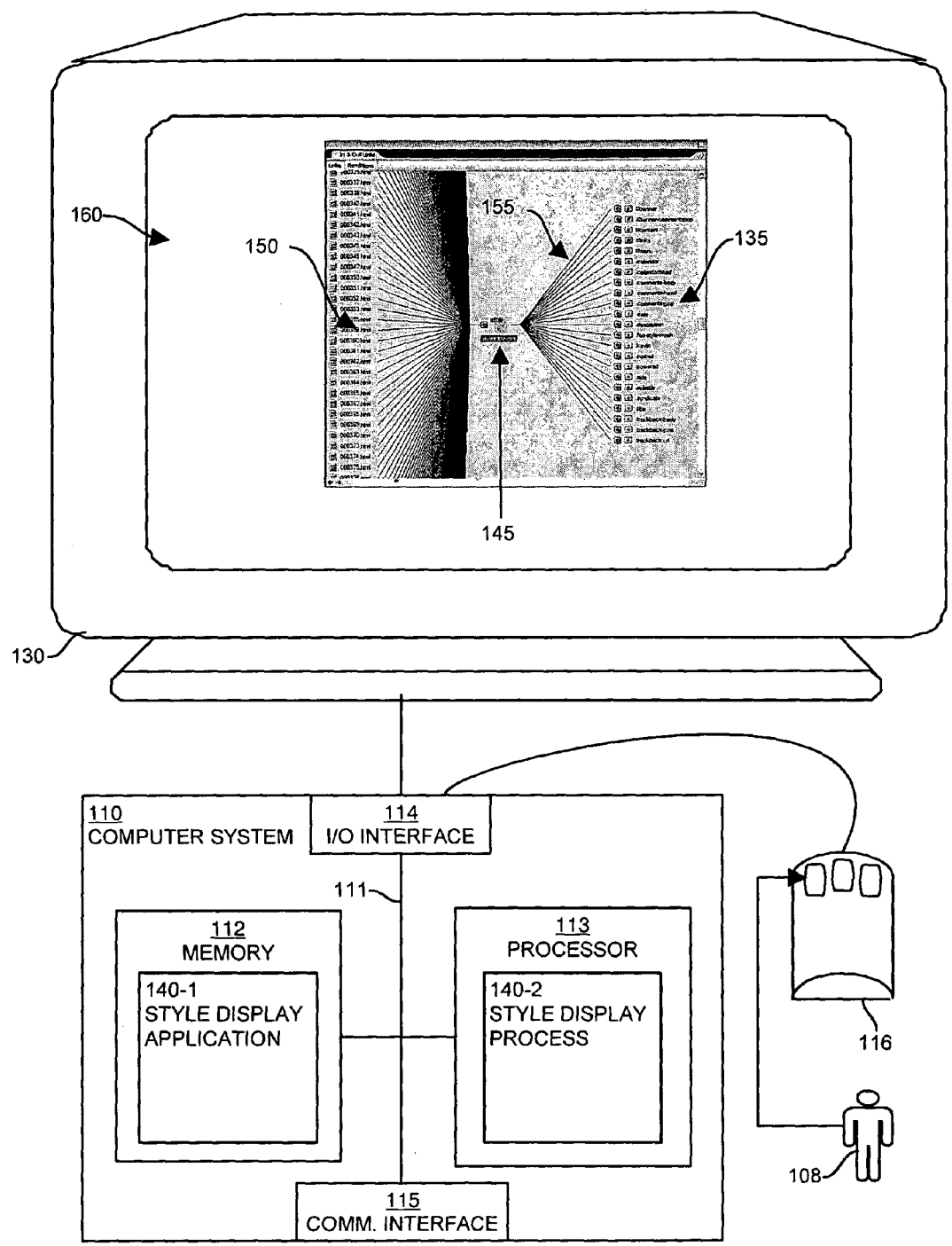
FIG. 1 shows a high-level block diagram of a computer system according to one embodiment disclosed herein.

FIG. 1 is a block diagram illustrating example architecture of a computer system 110 that executes, runs, interprets, operates or otherwise performs a style display application 140-1 and process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114 and enables a user 108 such as a web developer, to provide input commands and generally control the graphical user interface 160 that the style display application 140-1 and process 140-2 provides on the display 130. The graphical user interface 160 displays the output of the style display process 140-2, containing a style file 145 (i.e. a Cascading Style Sheet or an HTML file that defines a style), associated styles 135 and application files 150 (i.e. HTML files) that reference the style file 145. The style file 145 is linked to the styles 135 with an association 155 to a file. The communications interface 115 enables the computer system 110 to communicate with other devices (i.e., other computers) on a network (not shown). This can allow access to the style display application by remote computer systems.

The memory system 112 is any type of computer readable medium and in this example is encoded with a style display application 140-1 that supports generation, display, and implementation of functional operations of the graphical user interface 160 as explained herein. The style display application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the style display application 140-1. Execution of style display application 140-1 in this manner produces processing functionality in a style display process 140-2. In other words, the style display process 140-2 represents one or more portions or runtime instances of the style display application 140-1 (or the entire application 140-1) performing or executing within or upon the processor 113 in the computerized device 110 at runtime. The style display process 140-2 operates as explained herein to display styles information within the graphical user interface 160. The user 108 selects a style 135, a style file 145, or an application file 150, and the style display process 140-2 displays the association 155 between the style 135, the style file 145 and/or the application file 150.

It is noted that example configurations disclosed herein include the style display application 140-1. The style display application 140-1 may be stored on a computer readable medium (such as a floppy disk), hard disk, electronic, magnetic, and optical or other computer readable medium. The style display application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the style display application 140-1 in the processor 113 as the style display process 140-2. Those skilled in the art will understand that the computer system 110 may include other processes and/or software and hardware components, such as an operating system not shown in this example.

A display 130 need not be coupled directly to computer system 110. For example, the style display application 140-1 can be executed on a remotely accessible computerized device via the network interface 115. In this instance, the graphical user interface 160 may be displayed locally to a user of the remote computer and execution of the processing herein may be client-server based.

FIGS. 2 through 6 provide example screen shots of graphical user interfaces produced by the style display process 140-2 in accordance with the invention. These figures will be introduced briefly below and will be discussed in more detail in conjunction with flow charts that follow FIG. 6.

Figure 2:
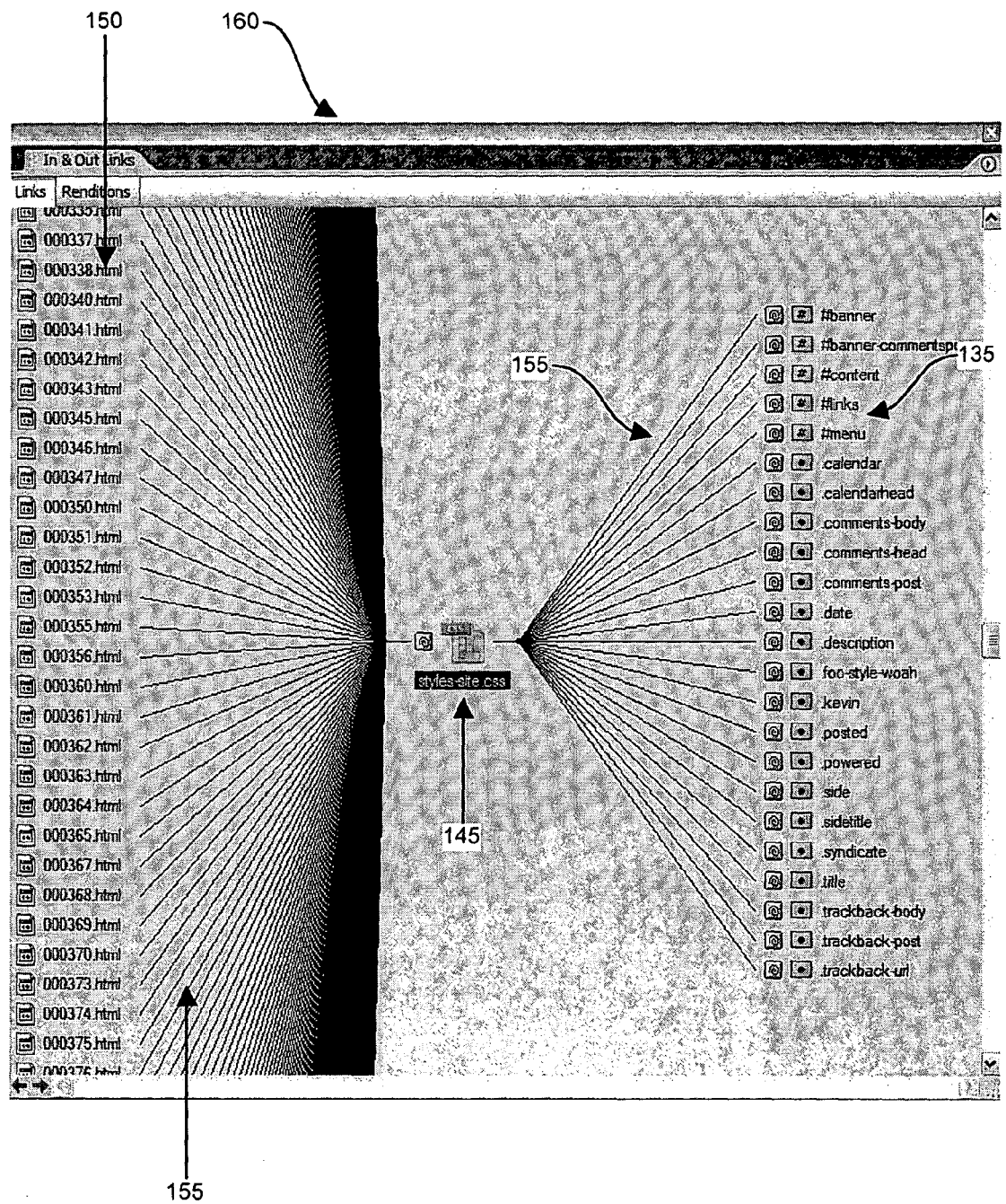
FIG. 2 shows a screen shot of the system of FIG. 1 displaying the relationship between a style file, the styles defined within the style file, and the application files that utilize that style file, according to one embodiment disclosed herein.

FIG. 2 is a screen shot of the graphical user interface 160 containing the style file 145, the association 155 to the style 135, and the association 155 to the application file 150. The user selects the style file 145 to view the relationship between the style file 145, the styles 135 and the application files 150.

Figure 3:
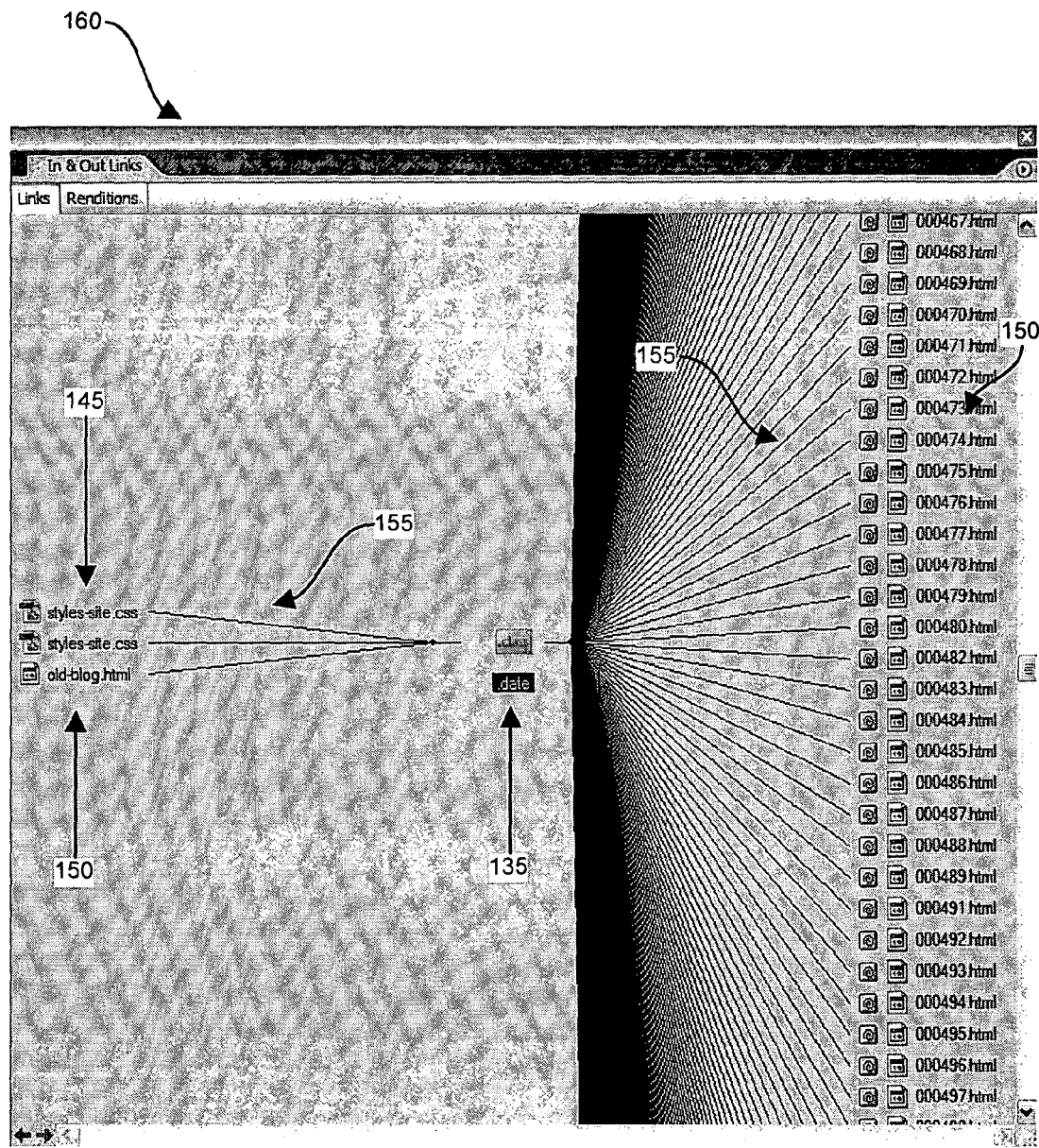
FIG. 3 shows a screen shot of the system of FIG. 1 displaying the relationship between a style, the application files that utilize that style, and the style files or application files that define that style, according to one embodiment disclosed herein.

FIG. 3 is a screen shot of the graphical user interface 160 containing the style 135, the association 155 to the application file 150, and the association 155 to the style file 145 and/or application file 150 that define the style 135. The user selects the style 135 to view the relationship between the style 135, the application files 150 that utilize the style 135 and the style files 145 and/or application files 150 that define the style 135.

Figure 4:
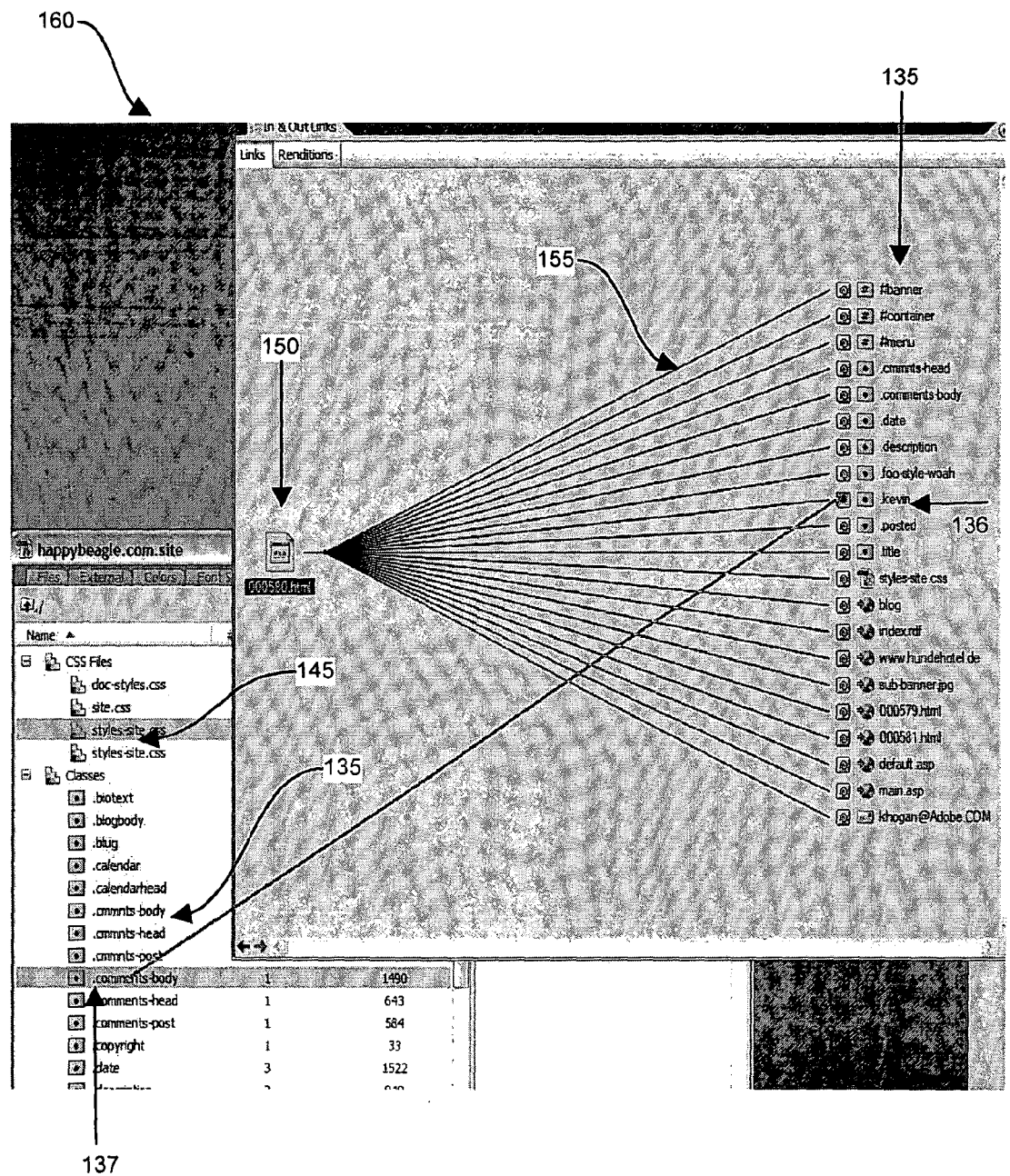
FIG. 4 shows a screen shot of the system of FIG. 1 displaying the relationship between an application file, the styles utilized by the application file, and a list view of the style files and styles within the collection of web pages, according to one embodiment disclosed herein.

FIG. 4 is a screen shot of the graphical user interface 160 containing the application file 150, and the association 155 between the application file 150 and the styles 135 either utilized by the application file 150 and/or defined within the application file 150. FIG. 4 also shows the list view form of the styles 135 and style files 145 contained within a collection of web pages of which the application file 150 is one.

Figure 5:
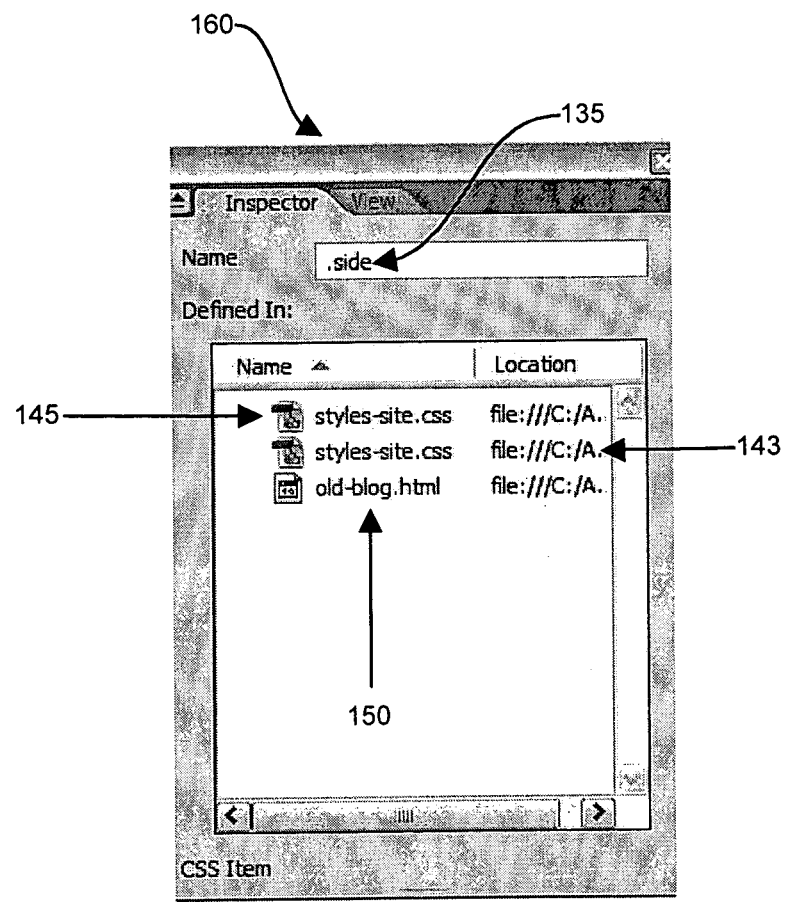
FIG. 5 shows a screen shot of the system of FIG. 1 displaying the relationship, in a list view form, between a style, and the style files and application files that define that style, according to one embodiment disclosed herein.

FIG. 5 is a screen shot of the graphical user interface 160 containing a list view of the style 135 and the style files 145 and/or application files 150 that define the style 135, along with the pathnames of the locations of those style files 145 and/or application files 150 that define the style 135.

FIG. 6 is a screen shot of the graphical user interface 160 containing a list view of the style files 145 and styles 135 contained within the collection of web pages, along with a listing of how many times each style file 145 is used and how many times each style 135 is defined and used within the collection of web pages.

Further details of configurations explained herein will now be provided with respect to a flow chart of processing steps that show the high level operations disclosed herein to perform the style display process 140-2.

Figure 7:
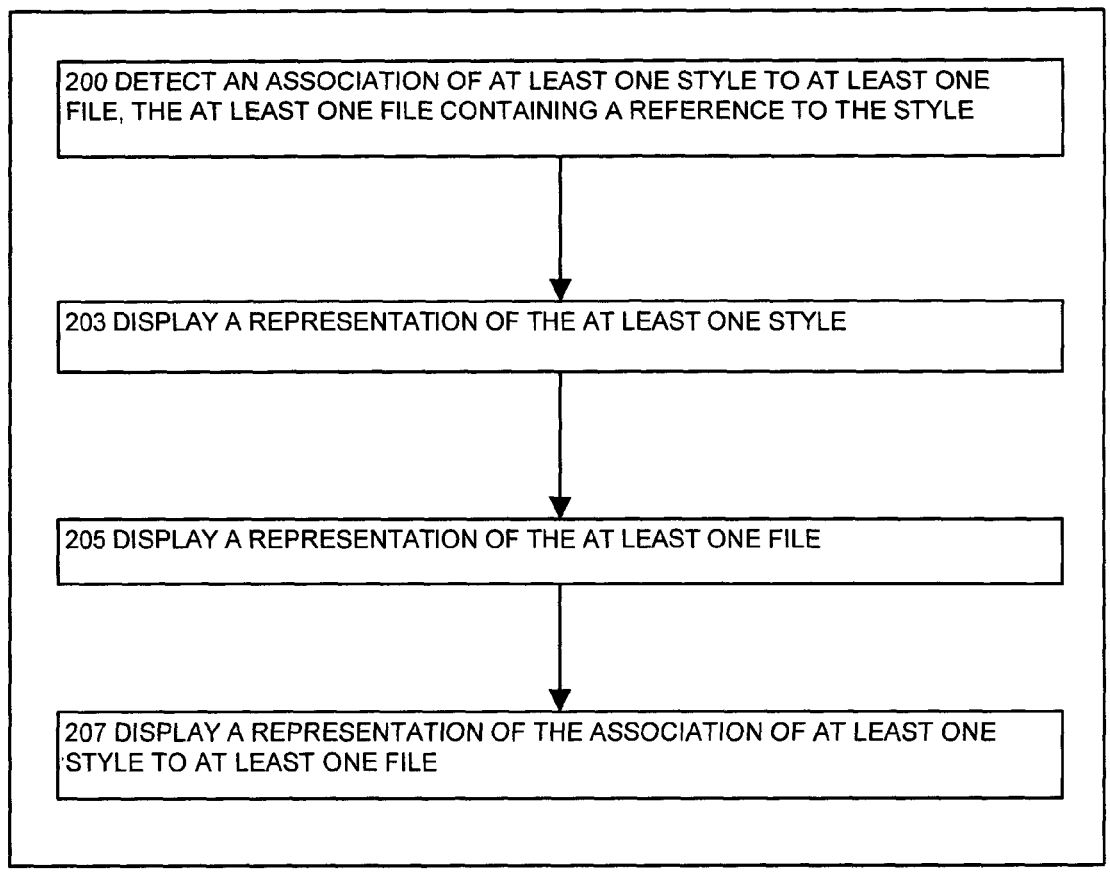
FIG. 7 illustrates a flowchart of a procedure performed by the system of FIG. 1 when the style display process detects an association of at least one style to at least one file, the file containing a reference to the style, according to one embodiment disclosed herein.

FIG. 7 is a flowchart of the steps performed by the style display process 140-2 when it detects an association 155 of at least one style 135 to at least one file, the at least one file containing a reference to the style 135. A user 108 selects a style 135, a style file 145, or an application file 150 in order to view the relationship between a style 135 and a file (i.e. a style file 145 or an application file 150).

In step 200, the style display process 140-2 detects an association 155 of at least one style 135 to at least one file (i.e., either 145 or 150). The file(s) 145 and/or 150 contain a reference to the style 135. The file can be either a style file 145, or an application file 150. By reference, what is meant in one example configuration is that the style file 145 can define the style 135, but the application file 150 can define and/or utilize the style 135.

In step 203, the style display process 140-2 displays a representation of the style 135. Within the graphical user interface 160, the style display process 140-2 can display the style 135 as a graphical representation. The style display process 140-2 can also display the style 135 within a list view form.

In step 205, the style display process 140-2 displays a representation of the file. The style can be either a style file 145 or an application file 150. Within the graphical user interface 160, the style display process 140-2 can display the file as a graphical representation. The style display process 140-2 can also display the file within a list view form.

In step 207, the style display process 140-2 displays a representation of the association 155 of at least one style to at least one file. Within the graphical user interface 160, the style display process 140-2 can display the association 155 between the style 135 and the file as a line connecting the two graphical icons. The style display process 140-2 can also display the association 155 between the style 135 and the file by listing the style 135 and the file within a list view form.

Figure 8:
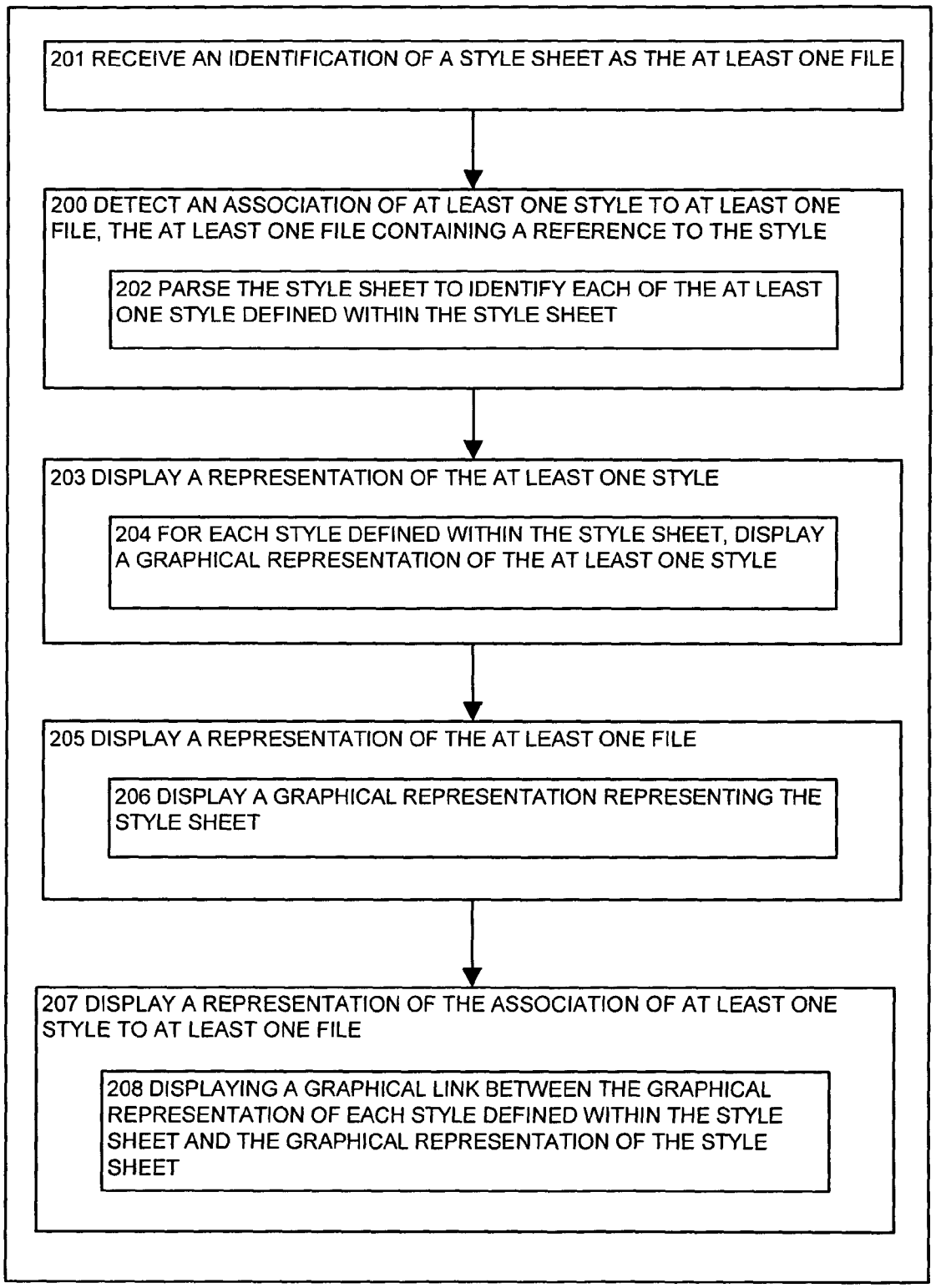
FIG. 8 illustrates a flowchart of a procedure performed by the system of FIG. 1 when the style display process receives an identification of a style sheet as the file, according to one embodiment disclosed herein.

FIG. 8 is a flowchart of the steps performed by the style display process 140-2 when it detects an association 155 of at least one style 135 to at least one file (e.g., either an application file 150 or a style file 145 such as a Cascading Style Sheet) that contains a reference to the style 135. The style display process 140-2 receives identification of the style file 145 and displays the association 155 between the style 135 and the style file 145.

In step 201, the style display process 140-2 receives an identification of a style file 145 such as a Cascading Style Sheet file. For example, a user 108 might select (e.g. using a mouse or other input device) the style file 145 as the file to be displayed in the center of the graphical user interface 160. FIG. 2 displays an example graphical user interface 160 of the style display process 140-2 where a user 108 has selected a style file 145.

In step 202, the style display process 140-2 parses the style file 145 to identify each of the styles 135 defined within the style file 145. The definition of a style 135 in the style file 145 indicates the association of the style 135 to that style file 145. The style display process 140-2 detects an association of each style 135 defined in the style file 145 in this manner. Thus by scanning or otherwise parsing a style file 145, such as a Cascading Style Sheet, the style display process 140-2 determines each style 135 that has an association to the style file 145.

In step 204, for each style 135 defined within the style sheet 145, the style display process 140-2 displays a graphical representation of the style 135. FIG. 2 displays an example graphical user interface 160 where all of the styles 135 defined within a style file 145 have been identified.

In step 206, the style display process 140-2 displays a graphical representation representing the style sheet 145. FIG. 2 displays an example graphical user interface 160 where the style file 145 is displayed as a graphical icon.

In step 208, the style display process 140-2 displays a graphical link between the graphical representations of each style 135 (e.g., shown as icons on the graphical user interface 160) defined within the style sheet 145 and the graphical representation of the style sheet 145 (shown as an icon in the center of the graphical user interface 160). FIG. 2 displays an example graphical user interface 160 depicting the association 155 between the style file 145 and the styles 135 identified by the style display process 140-2 as being defined within the style file 145.

Figure 9:
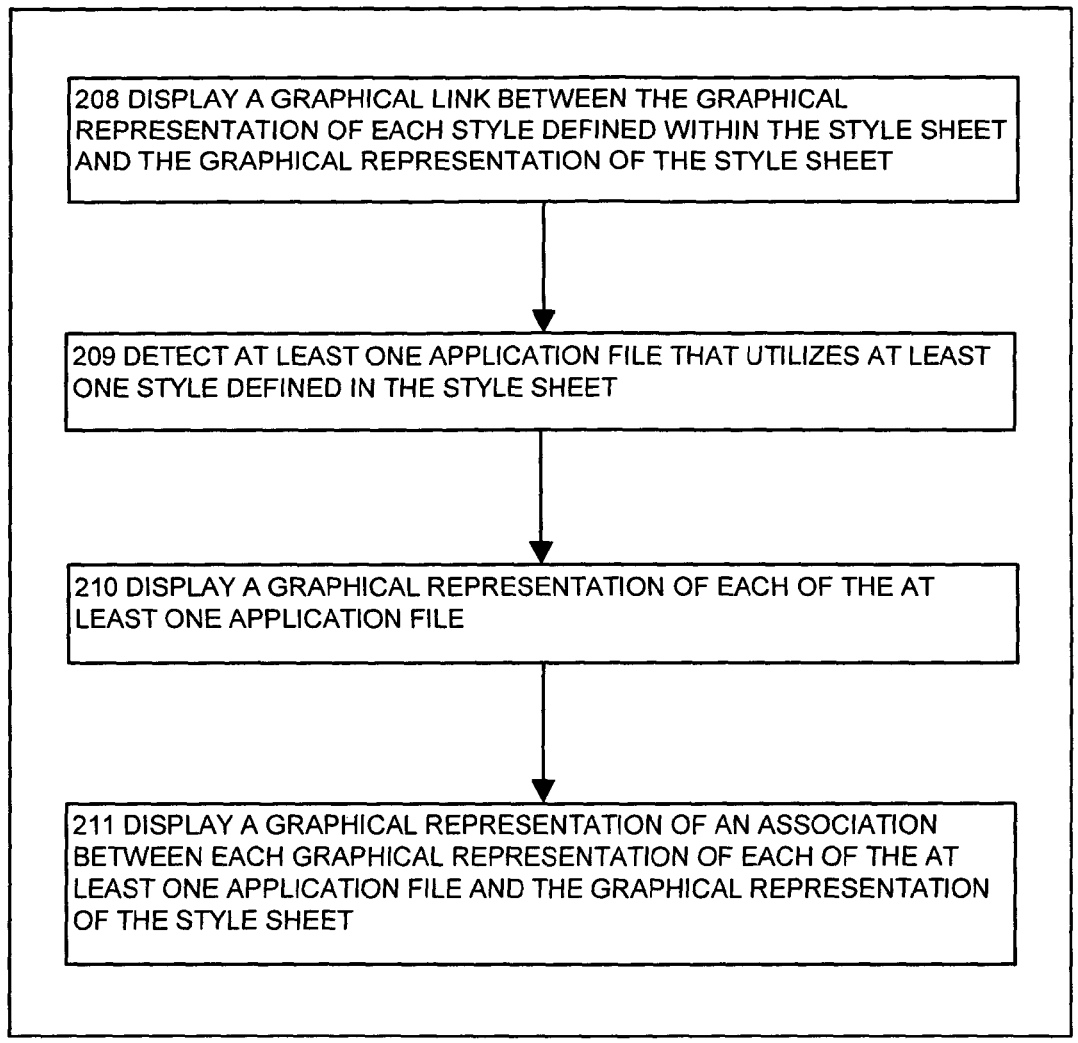
FIG. 9 illustrates a flowchart of a procedure performed by the system of FIG. 1 when the style display process displays a graphical link between the graphical representation of each style defined within the style sheet and the graphical representation of the style sheet, according to one embodiment disclosed herein.

FIG. 9 is a flowchart of the steps performed by the style display process 140-2 when it detects that at least one application file 150 references the style file 145 identified as the one file. The style display process 140-2 displays the application files 150 that reference the style file 145.

In step 209, the style display process 140-2 detects at least one application file 150 that utilizes at least one style 135 defined in the style sheet 145. The style display process 140-2 determines that at least one application file 150 file (i.e. an HTML file) utilizes one of the styles 135 defined within the style file 145. The application file 150 can reference the style file 145 within the application file 150 and not use the style 135 identified within the style file 145. The application file 150 can also use the style 135 identified within the style file 145.

In step 210, the style display process 140-2 displays a graphical representation of each of the application files 150. FIG. 2 displays an example graphical user interface 160 depicting a graphical representation of each of the application files 150 that reference the style file 145.

In step 211, the style display process 140-2 displays a graphical representation of an association 155 between each graphical representation of each of the application files 150, and the graphical representation of the style sheet 145. FIG. 2 displays an example graphical user interface 160 depicting the association 155 between the application file 150 (i.e. the HTML files) and the style file 145 (i.e. the Cascading Style Sheet).

Figure 10:
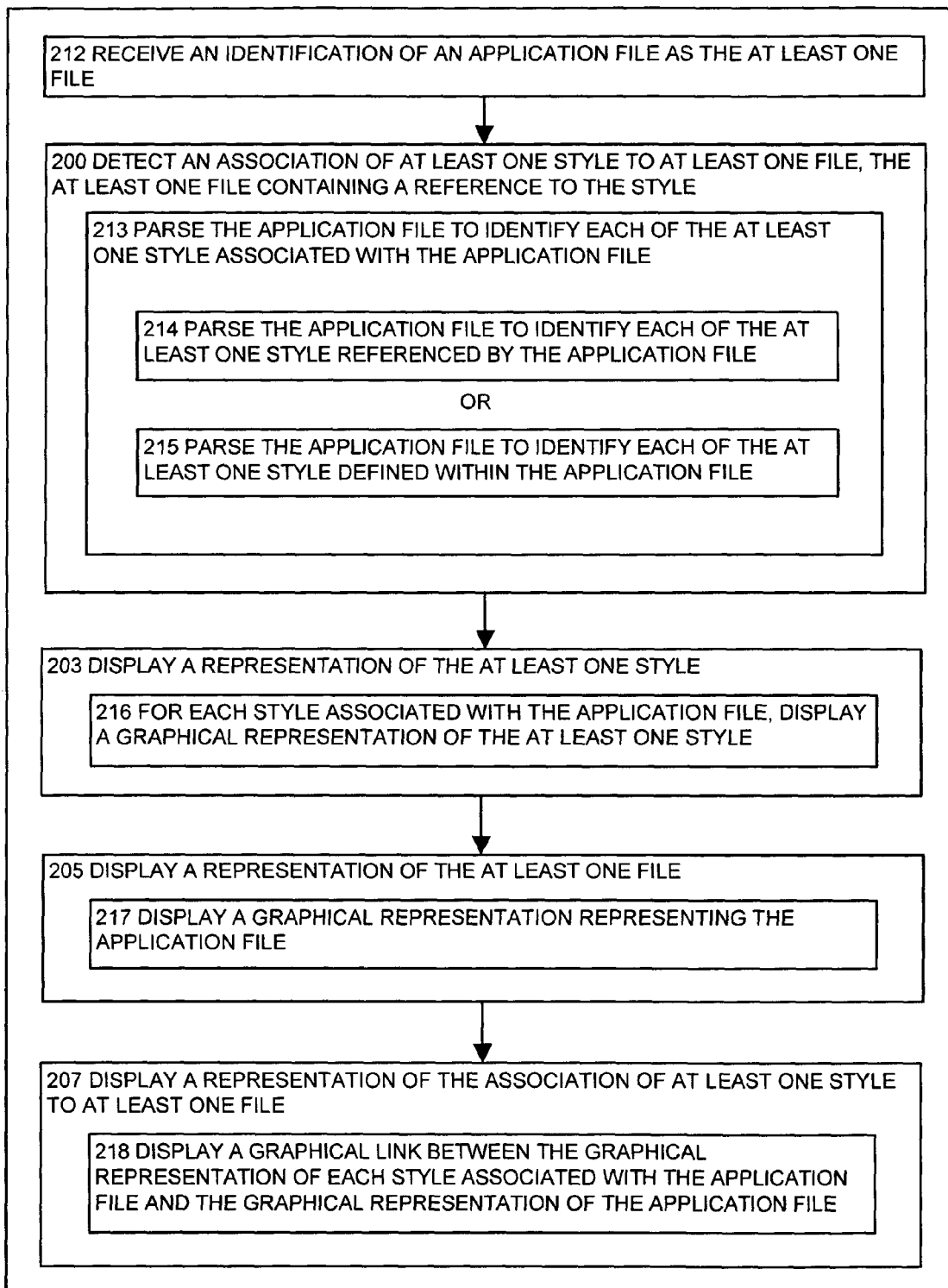
FIG. 10 illustrates a flowchart of a procedure performed by the system of FIG. 1 when the style display process receives an identification of an application file as the file, according to one embodiment disclosed herein.

FIG. 10 is a flowchart of the steps performed by the style display process 140-2 when it detects an association 155 of at least one style 135 to at least one file, the file containing a reference to the style 135, and identifies the file as an application file 150.

In step 212, the style display process 140-2 receives an identification of an application file 150 as the file. The application file 150 can be, for example, an HTML file, a PHP file, or any other type of display file that utilizes Cascading Style Sheets and/or styles 135.

In step 213, the style display process 140-2 parses the application file 150 to identify each of the styles 135 associated with the application file 150. A style 135 associated with an application file 150 can be either defined within the application file 150 or referenced by the application file 150, via a Cascading Style Sheet.

In one embodiment, in step 214, the style display process 140-2 parses the application file 150 to identify each of the styles 135 referenced by the application file 150. The application file 150 can reference the style 135 via a style file 145, such as a Cascading Style Sheet. The application file 150, essentially, includes the contents of the style file 145 in the application file 150, by referencing the style file 145 within the HTML coding of the application file 150. The style file 145 referenced by the application file 150 contains the styles 135 that are available for use to the application file 150. Thus the styles 135 are associated with the application file 150 via reference to a style file 145.

In one embodiment, in step 215, the style display process 140-2 parses the application file 150 to identify each of the styles 135 defined within the application file 150. The style 135 can be defined within the application file 150. By defining the style 135 within the application file 150, that application file 150 can use that style 135. Thus, the styles 135 are associated with the application file 150 by being defined within the application file 150.

In step 216, for each style 135 associated with the application file 150, the style 135 display process 140-2 displays a graphical representation of the style 135. FIG. 4 displays an example graphical user interface 160 depicting a graphical representation of the styles 135 that have been determined to be associated with the application file 150.

In step 217, the style display process 140-2 displays a graphical representation representing the application file 150. FIG. 4 displays an example graphical user interface 160 depicting a graphical representation of the application file 150 identified by the style display process 140-2.

In step 218, the style display process 140-2 displays a graphical link between the graphical representations (e.g., icons on the graphical user interface 160) of each style 135 associated with the application file 150 and the graphical representation of the application file 150. FIG. 4 displays an example graphical user interface 160 depicting the association 155 between the application file 150 and the styles 135 determined to be associated (i.e. referenced via a Cascading Style Sheet or defined within the application file 150) with the application file 150.

Figure 11:
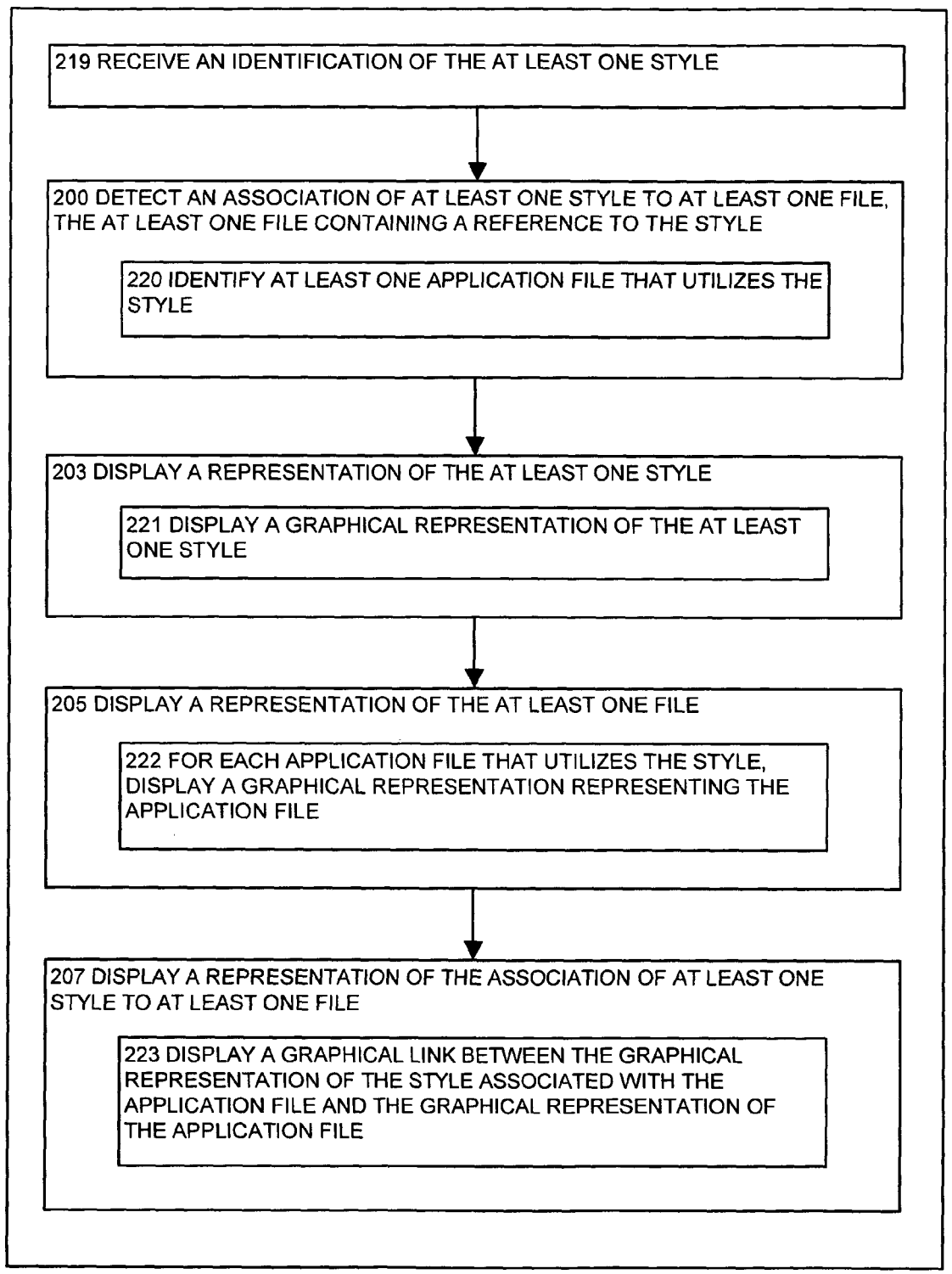
FIG. 11 illustrates a flowchart of a procedure performed by the system of FIG. 1 when the style display process receives an identification of at least one style, according to one embodiment disclosed herein.

FIG. 11 is a flowchart of the steps performed by the style display process 140-2 when it detects an association of at least one style 135 to at least one file, the at least one file containing a reference to the style 135.

In step 219, the style display process 140-2 receives an identification of the style 135. For example, a user 108 may have selected (e.g. via a mouse) a style 135 to identify the style 135.

In step 220, the style display process 140-2 identifies at least one application file 150 that utilizes the style 135. The application file 150 that utilizes the style 135 is a file that calls a style file 145, by reference, to gain access to the style 135 defined within that style file 145.

In step 221, the style display process 140-2 displays a graphical representation of the styles 135. FIG. 3 displays an example graphical user interface 160 depicting a graphical representation of the style 135. The style 135 is depicted as a .class icon with a title identifying the name of the style 135.

In step 222, for each application file 150 that utilizes the style 135, the style display process 140-2 displays a graphical representation representing the application file 150. FIG. 3 displays an example graphical user interface 160 depicting a graphical representation of each of the application files 150. The application files 150 are depicted as an HTML icon with a title identifying the name of each of the application files 150. All of these application files 150 are the application files 150 that utilize the style 135 by referencing the style files 145 (i.e. the Cascading Style Sheet) that define this style 135.

In step 223, the style display process 140-2 displays a graphical link between the graphical representations of the style 135 associated with the application file 150 and the graphical representation of the application file 150. FIG. 3 displays an example graphical user interface 160 depicting a graphical representation of the association 155 between the style 135 and the application files 150 that utilize the style 135.

Figure 12:
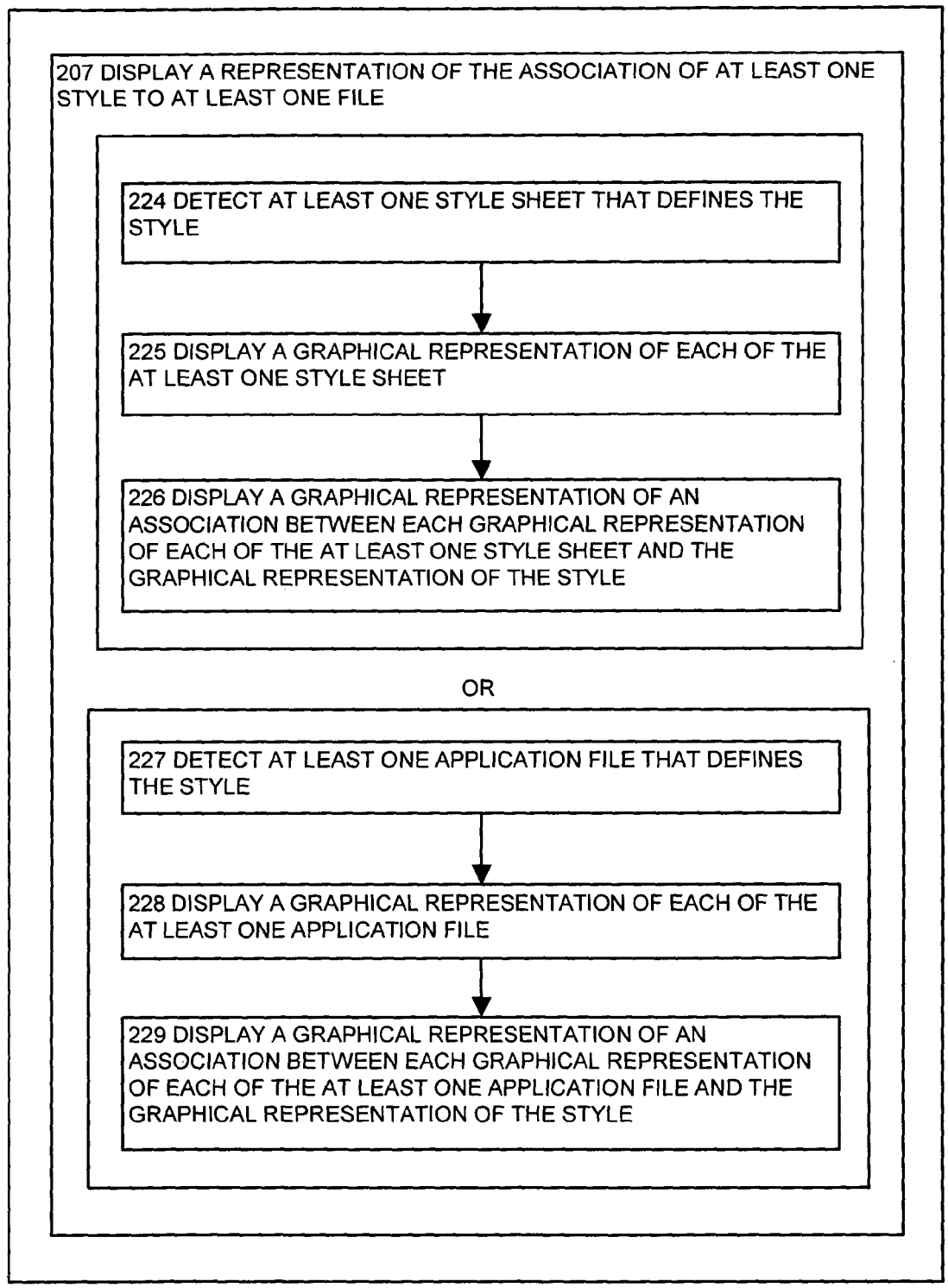
FIG. 12 illustrates a flowchart of a procedure performed by the system of FIG. 1 when the style display process displays a representation of the association of at least one style to at least one file, according to one embodiment disclosed herein.

FIG. 12 is a flowchart of the steps performed by the style display process 140-2 when it displays a representation of the association 155 of at least one style 135 to at least one file. In one embodiment, the style display process 140-2 displays both the representation of the style 135 to the file that utilizes the style 135 as well as a representation of the style 135 to the style file 145 that defines the style 135. The style file 145 that defines the style 135 can be either a Cascading Style Sheet or an application file 150, such as an HTML file, that defines the style 135.

In step 224, the style display process 140-2 detects at least one style sheet 145 that defines the style 135. For example, the style file 145 could be a Cascading Style Sheet file that defines one or more styles 135. The style display process 140-2 can use parsing as mentioned above to perform this detection process.

In step 225, the style display process 140-2 displays a graphical representation of each of the style sheets 145. FIG. 3 displays an example graphical user interface 160 depicting a graphical representation of each of the style files 145 that define the style 135.

In step 226, the style display process 140-2 displays a graphical representation of an association 155 between each graphical representation of each of the styles sheets 145 and the graphical representation of the style 135. FIG. 3 displays an example graphical user interface 160 depicting a graphical representation of the association 155 between the style 135 and the style files 145 that define the style 135.

In one embodiment, in step 227, the style display process 140-2 detects at least one application file 150 that defines the style 135. The style 135 can be defined within a Cascading Style Sheet file and/or an application file 150 (i.e. an HTML file).

In step 228, the style display process 140-2 displays a graphical representation of each of the application files 150 that defines the style 135. FIG. 3 displays an example graphical user interface 160 depicting a graphical representation of each of the application files 150 that define the style 135.

In step 229, the style display process 140-2 displays a graphical representation of an association 155 between each graphical representation of each of the application files 150 and the graphical representation of the style 135. FIG. 3 displays an example graphical user interface 160 depicting a graphical representation of the association 155 between the style 135 and the application files 150 that define the style 135.

Figure 13:
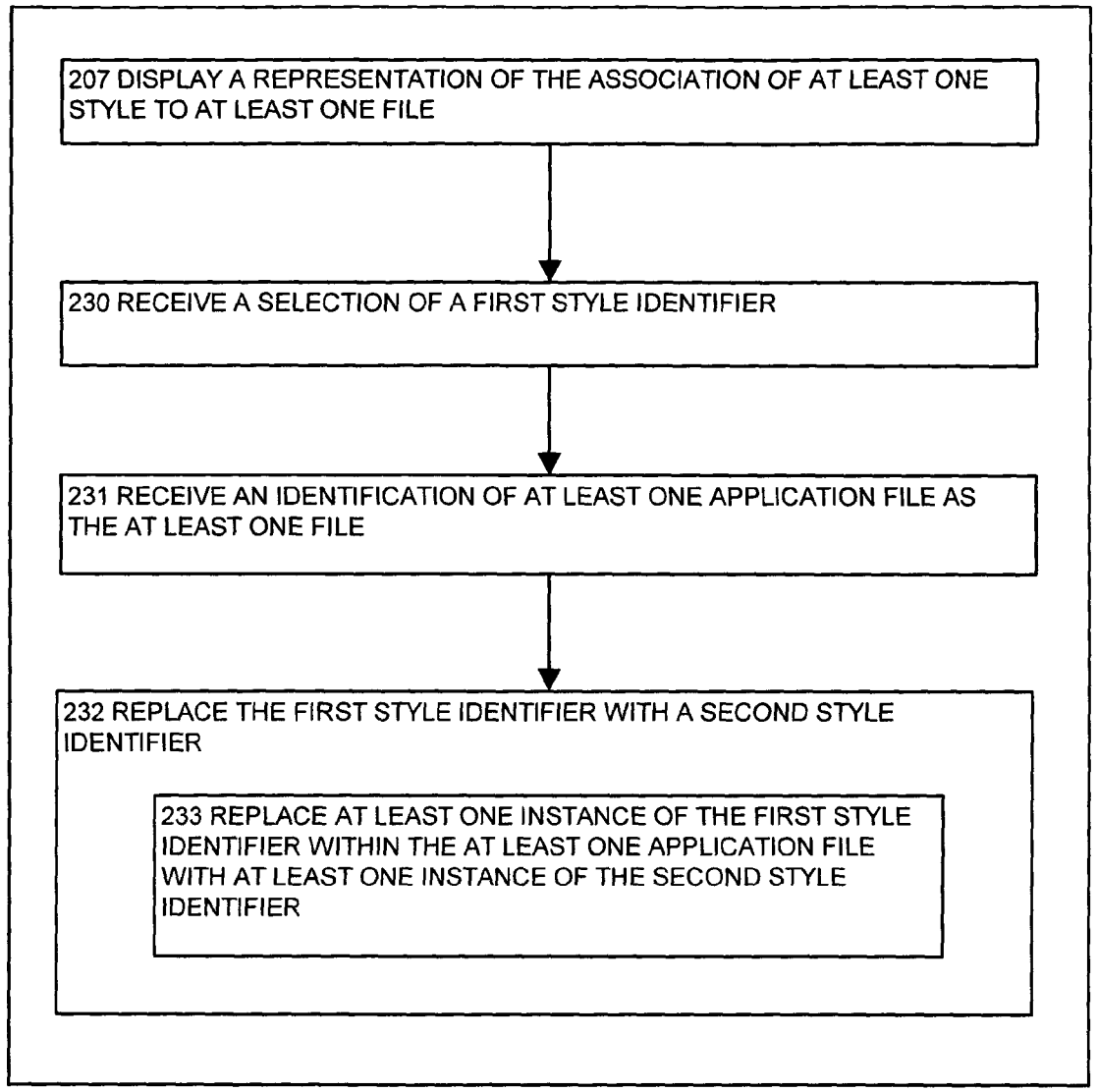
FIG. 13 illustrates a flowchart of a procedure performed by the system of FIG. 1 when the style display process displays a representation of the association of at least one style to at least one file, according to one embodiment disclosed herein.

FIG. 13 is a flowchart of the steps performed by the style display process 140-2 when it receives a selection of a first style identifier 137 to be replaced with a second style identifier 136, with the intent of propagating that change throughout any application file 150 that is associated with the style 135 that is associated with the first style identifier 137.

In step 230, the style display process 140-2 receives a selection of a first style identifier 137. The first style identifier 137 is associated with a first style 135. For example, the style display process 140-2 receives the selection of the first style identifier 137 from a user 108 who wishes to replace all instances of a first style identifier 137 with a second style identifier 136.

In step 231, the style display process 140-2 receives an identification of at least one application file 150 as the file.

In step 232, the style display process 140-2 replaces the first style identifier 137 with a second style identifier 136. The second style identifier 136 is associated with a second style 135. FIG. 4 displays an example graphical user interface 160 depicting a graphical representation of the first style identifier 137 being selected to replace the second style identifier 136.

In step 233, the style display process 140-2 replaces at least one instance of the first style identifier 137 within the application file 150 with at least one instance of the second style identifier 136. The style display process 140-2 propagates the modification (the substitution of the first style identifier 137 with the second style identifier 136) through any application file 150 that is associated with the first style identifier 137. The replacement can be an actual replacing of style "A" with an existing style "B", or can be simply renaming style "A" to style "B".

Figure 14:
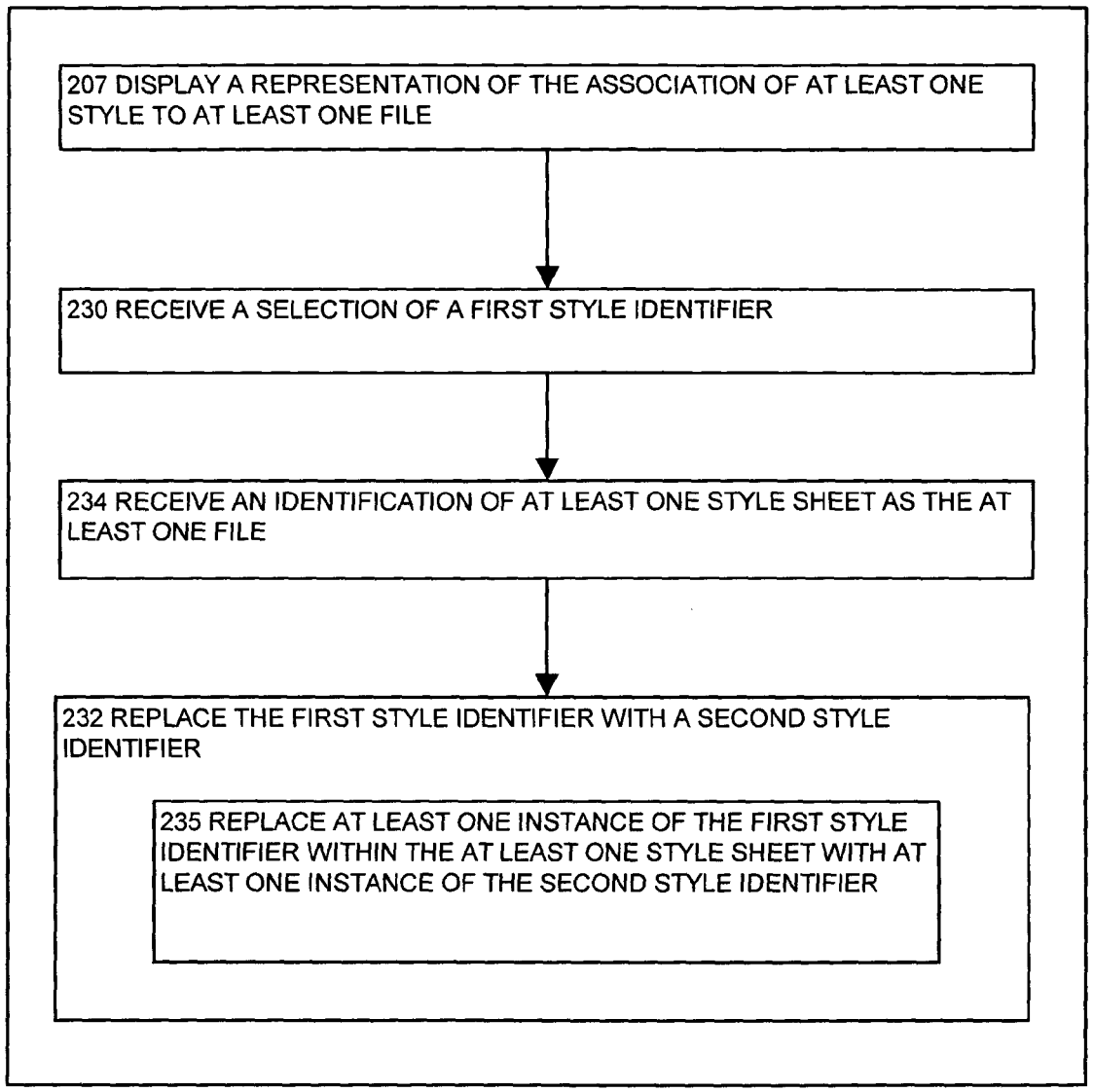
FIG. 14 illustrates a flowchart of a procedure performed by the system of FIG. 1 when the style display process displays a representation of the association of at least one style to at least one file, according to one embodiment disclosed herein.

FIG. 14 is a flowchart of the steps performed by the style display process 140-2 when it receives a selection of a first style identifier 137 to be replaced with a second style identifier 136 with the intent of propagating that change throughout any style file 145 that defines the style 135 associated with the first style identifier 137.

In step 230, the style display process 140-2 receives a selection of a first style identifier 137. The first style identifier 137 is associated with a first style 135. For example, the style display process 140-2 receives the selection of the first style identifier 137 from a user 108 who wishes to replace all instances of a first style identifier 137 with a second style identifier 136.

In step 234, the style display process 140-2 receives an identification of at least one style sheet 145 as the file.

In step 232, the style display process 140-2 replaces the first style identifier 137 with a second style identifier 136. The second style identifier 136 is associated with a second style 135. FIG. 4 displays an example graphical user interface 160 depicting a graphical representation of the first style identifier 137 being selected to replace the second style identifier 136.

In step 235, the style display process 140-2 replaces the first style identifier 137 with a second style identifier 136. The second style identifier 136 is associated with a second style 135. The style display process 140-2 propagates the modification (the substitution of the first style identifier 137 with the second style identifier 136) through any style file 145 that is associated with the first style identifier 137.

Figure 15:
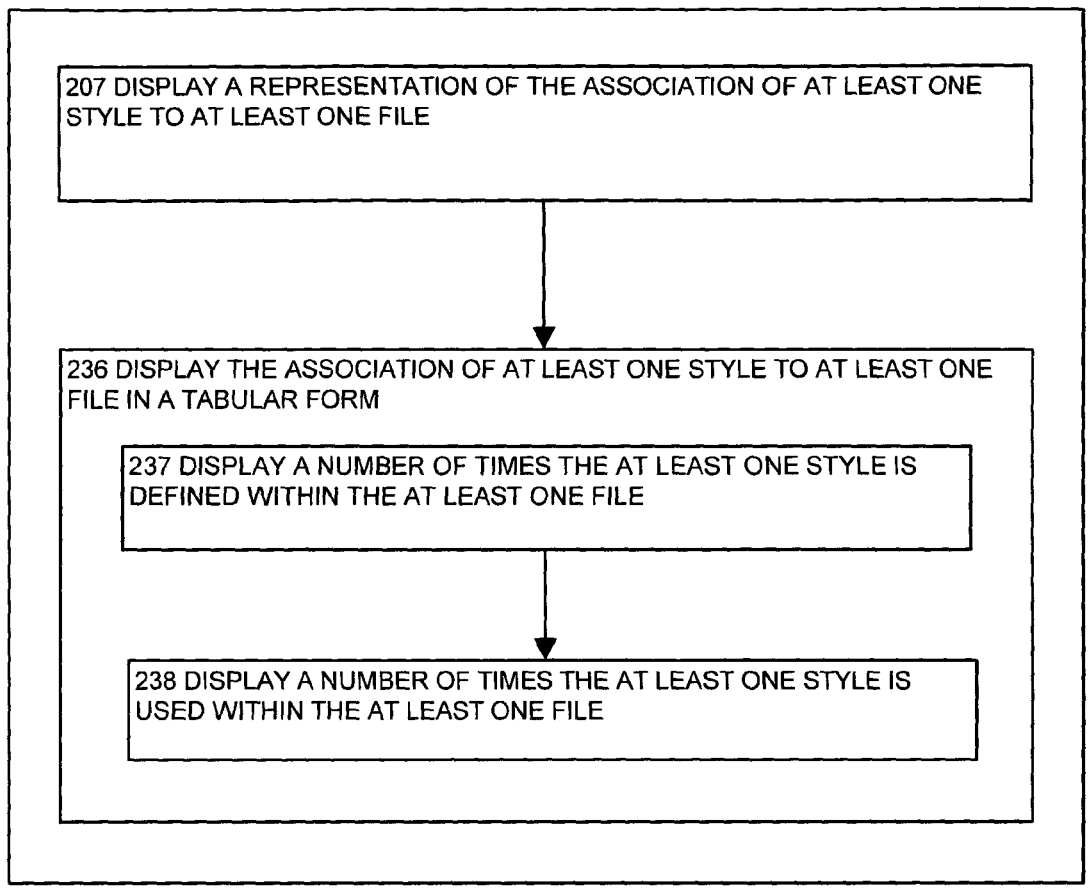
FIG. 15 illustrates a flowchart of a procedure performed by the system of FIG. 1 when the style display process displays a representation of the association of at least one style to at least one file, according to one embodiment disclosed herein.

FIG. 15 is a flowchart of the steps performed by the style display process 140-2 when it displays the association of the at least one style 135 to the at least one file in tabular form. In one embodiment, the association between the style and the file is displayed within a tabular or list view form.

In step 236, the style display process 140-2 displays the association of at least one style 135 to at least one file. The association is displayed in a tabular form. FIG. 5 displays an example graphical user interface 160 depicting a graphical representation, in tabular form, of a style 135 and any style 135 or application file 150 that defines the style 135. FIG. 5 depicts an identified style 135 and a listing of style files 145 (i.e. Cascading Style Sheets) and application file 150 (i.e. a HTML file) that define the identified style 135, as well a location of the style file 143.

In step 237, the style display process 140-2 displays a number of times the style 135 is defined within the file. Most styles 135 should be defined once. If a style 135 is defined more that once, it could potentially cause difficulty in debugging style related problems since a web developer would have to determine which files are utilizing which definition of the style 135 contributing to the problem. A style 135 that is used, but not defined, will cause an error. FIG. 6 displays an example graphical user interface 160 depicting a graphical representation, in tabular form, of a listing of the number of times each style 135 is defined 147.

In step 238, the style display process 140-2 displays a number of times the style 135 is used 148 within the file. FIG. 6 displays an example graphical user interface 160 depicting a graphical representation, in tabular form, of a listing of a style file 145 and style 135, and the number of times each style 135 or style file 145 is used 148. The tabular form of FIG. 6 allows a user 108 to determine if a style 135 or style file 145 that is defined 147 but not used 148, should be removed.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method comprising:
   identifying a style;
   detecting, via a processor, at least one reference in at least one defining file to the style, each of the at least one defining file defining the style;
   detecting, via a processor, at least one reference in at least one utilizing file to the style, each of the at least one utilizing file utilizing the style;
   providing for display, via the processor,
      a first icon identifying the style;
      at least one second icon identifying each of the at least one defining files;

at least one third icon identifying each of the at least one utilizing files; and at least one graphical representation indicating that each of the at least one defining file defines the style and that each of the at least one utilizing file utilizes the style.

2. The method of claim 1 wherein the at least one defining file comprises at least one style sheet file.

3. The method of claim 1 wherein the at least one defining file comprises at least one application file that both defines and utilizes the style.

4. The method of claim 1 wherein the at least one defining file comprises at least one style sheet file and at least one application file, the application file both defining and utilizing the style.

5. The method of claim 1 wherein the first icon comprises text providing a name of the style.

6. The method of claim 1 wherein the at least one graphical representation comprises one or more lines linking the at least one second icon identifying each of the at least one defining file to the first icon identifying the style.

7. The method of claim 1 wherein the at least one graphical representation comprises one or more lines linking the at least one third icon identifying each of the at least one utilizing file to the first icon identifying the style.

8. A method comprising:

identifying a style sheet file;

detecting, via a processor, at least one reference in at least one application file to the style, each of the at least one application file utilizing the style sheet file;

detecting, via a processor, at least one style defined in the style sheet file;

providing for display, via the processor, a first icon identifying the style sheet file;

at least one second icon identifying each of the at least one application files;

at least one third icon identifying each of the at least one style defined in the style sheet file; and at least one graphical representation indicating that each of the at least one application file utilizes the style sheet file and that each of the at least one style is defined in the style sheet file.

9. The method of claim 8 wherein the first icon comprises text providing a name of the style sheet file.

10. The method of claim 8 wherein the at least one graphical representation comprises one or more lines linking the at least one second icon identifying each of the at least one application files to the first icon identifying the style sheet file.

11. The method of claim 8 wherein the at least one graphical representation comprises one or more lines linking the at least one third icon identifying each of the at least one style defined in the style sheet file to the first icon identifying the style sheet file.

* * * * *